United States Patent

[11] 3,541,997

| [72] | Inventor | Charles Marchand |
| | | 7002 19° Avenue, Ville St-Michel Quebec, Canada |
| [21] | Appl. No. | 812,675 |
| [22] | Filed | April 2, 1969 |
| [45] | Patented | Nov. 24, 1970 |

[54] COVER AND PAN COMBINATION
7 Claims, 3 Drawing Figs.

[52] U.S. Cl. .................................................. 126/381, 220/45
[51] Int. Cl. .......................................... H47j 27/00
[50] Field of Search ........................................... 220/45; 126/381; 99/293, 347

[56] References Cited
UNITED STATES PATENTS

| 2,220,250 | 11/1940 | Lannerd et al. | 220/45X |
| 2,622,591 | 12/1952 | Bramberry | 126/381 |

*Primary Examiner*—George T. Hall
*Attorney*—Raymond A. Robic

ABSTRACT: The invention consists of a cooking pan and a cover in which the flat edge of the cover rests on a convex portion of the rim of the pan so that a liquid which is spread between the said portion and the said flat edge provides a seal produced by superficial tension. A concave gutter surrounds the convex portion. The cover is preferably convex with a central depression.

Patented Nov. 24, 1970
3,541,997
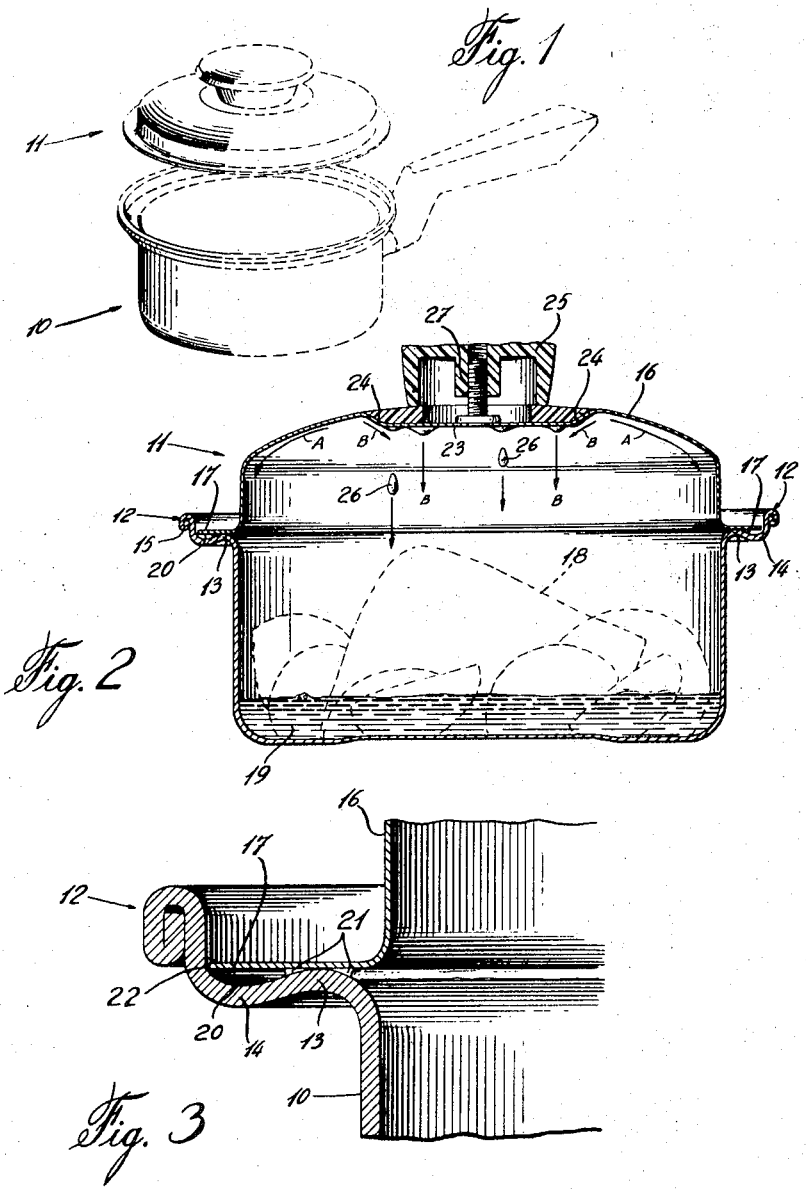
INVENTOR
Charles MARCHAND
BY
ATTORNEY

COVER AND PAN COMBINATION

The present invention relates to a combination of a pan and a cover which operate as a pressure cooker.

The majority of known pressure cookers are of the screwtight cover which are costly to produce and dangerous to operate.

The present invention has the advantage of cooking food under pressure with only a small amount of liquid wherein the seal is produced by liquid spread between the cover and the pan which attracts the cover on the pan by superficial tension.

The combination according to the present invention constitutes an economical and safe arrangement.

The present invention provides a vacuum in the pan when it is refrigerated.

The present invention further relates to a cover which provides for an improved wetting arrangement for the food in the pan when cooking.

In the drawings which illustrate an embodiment of the invention:

FIG. 1 represents an exploded view of the pan and the cover;

FIG. 2 represents a sectional view of the combination of the cover and the pan; and FIG. 3 represents a magnified view of the rim of the rim of the pan and the edge of the cover.

FIG. 1 shows a general view partly in dotted lines of the invention consisting of a pan 10 and a cover 11. The pan has generally a circular shape and has as its upper end a large rim 12 comprising a convex portion 13 and a continuous concave portion 14 surrounded by a raised border or lip 15.

A cover 11 having a convex central portion 16 and a flat edge 17 is adapted to rest by its flat edge 17 on the convex portion 13 of the rim 12. The raised border or lip 15 of the pan is folded in order to increase the solidity of the rim 12.

When some food generally represented by 18 is cooked into a small amount of water 19, at least few drops of water is usually spread in the gutter 20 and over the convex portion 13 so that when the cover 16 is placed over the said convex portion 13 and rotated thereon, the water droplets are spread between the convex portion 13 and the facing portion of the edge 17 to form a liquid film 21. This liquid film 21 may also be obtained from the evaporation of the water 19 in the bottom of the pan 10. The film of liquid 21 spread over the convex portion 13 creates a superficial tension and attracts the edge 17 of the cover and prevents it from being lifted unless a fair amount of strength is used to separate the cover from the pan.

All through the cooking, the liquid film 21 seals the opening between the cover and the pan. The pressure inside the pan is maintain and the foods 18 are therefore cooked under pressure.

Any evaporation of the film 21 is replaced by the evaporation of the water 19 in the bottom of the pan. In order to reduce as much as possible the evaporation of the liquid film 21, the thickness of the cover is preferably made of a thinner gauge than the one of the pan. The thin metal of the cover cools more rapidly than the thicker metal of the pan and prevents the liquid film 21 from being evaporated. A good combination has been found to be a one-ply metal for the cover and a three-ply metal for the pan. The gutter 20 is large enough to receive the water which evaporates from the liquid film 21 but should preferably be thin enough to squeeze any droplets of water located therein when the cover is placed on the pan. Accordingly, the droplets will move towards the convex portion 13 and when the cover is rotated or spun over the pan the droplets will spread to form the film 21 which attracts the cover by superficial tension.

A space 22 is left between the edge of the cover and the raised border 15 so that any water remaining in the gutter 20 would not have a tendency when heated to cause a vapor pressure which would break the seal of the liquid film 21.

The radius of the convex portion 13 will be dimensioned so as to enable the retention of a maximum amount of liquid by superficial tension. It has been found that for the majority of cooking pans, the radius of the convex portion 13 may vary approximately between one-eighth and one-half of an inch.

In the present pressure cooker, it has been found useful to humidify the food from the water condensation dropping from the cover 16. The cover being of a convex shape the water condensation will follow the arrows A and wet the foods around the outer periphery of the pan. In order to wet the food located in the middle portion of the pan, an inward projection 23 is formed around the central part of the cover 16. The projection 23 has a flat lower surface which extends to the convex surface of the cover 16 through a slope 24. The evaporation which deposits on the surface 23 and the slopes 24 will move down in the direction of the arrows B and wet the foods located in the central part of the pan. The dimension of the surface 23 may vary according to the desired repartition of the water droplets coming from the cover. It has been found that the diameter of the flat surface 23 may vary from one-fourth to seven-eighths of the diameter of the cover.

A knob 25 is fixed to the cover 16 by a screw 27 which is welded on the upper part of the surface 23. Considering that the foods 18 are cooked with only a small amount of water 19, it is important that the distribution of the water droplets 26 be spread in order to humidify a substantially large portion of the food in the pan.

Although a specific embodiment of the invention has just been described, it will be understood that various modifications may be made thereto without departing from the invention, the scope of which is only to be construed from the appended claims.

I claim:

1. The combination of a pan and cover, the pan having a large rim comprising a convex portion and an adjacent concave portion surrounded by a raised border, the cover having a central portion surrounded by a substantially flat edge, the said edge adapted to rest on the convex portion of the pan, so that a liquid spread between the said convex portion and the said flat edge provides a seal produced by superficial tension.

2. The combination as recited in claim 2, wherein the convex portion has a radius adapted to retain a maximum amount of liquid by the superficial tension.

3. A combination as recited in claim 1, wherein the radius of the convex portion is between one-eighth and one-half of an inch.

4. The combination as recited in claim 1, wherein the cover is made of metal thinner than the metal of the pan.

5. The combination as recited in claim 1, wherein the cover is one-ply and the pan is three-ply.

6. The combination as recited in claim 1, wherein the central portion of the cover is convex and has an inward middle projection.

7. The projection as recited in claim 1, wherein the central portion of the cover has an inward projection tapering down to a flat surface, the said flat surface having a diameter approximately between seven-eighths and one-quarter of the diameter of the pan.